US012696241B2

(12) United States Patent
Liu et al.

(10) Patent No.: US 12,696,241 B2
(45) Date of Patent: Jul. 28, 2026

(54) INFORMATION TRANSMISSION METHOD AND APPARATUS, AND TERMINAL DEVICE

(71) Applicant: VIVO MOBILE COMMUNICATION CO., LTD., Chang'an Dongguan (CN)

(72) Inventors: Shixiao Liu, Chang'an Dongguan (CN); Zichao Ji, Chang'an Dongguan (CN); Siqi Liu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 559 days.

(21) Appl. No.: 17/990,114

(22) Filed: Nov. 18, 2022

(65) Prior Publication Data

US 2023/0082126 A1      Mar. 16, 2023

Related U.S. Application Data

(63) Continuation of application No. PCT/CN2021/097638, filed on Jun. 1, 2021.

(30) Foreign Application Priority Data

Jun. 2, 2020    (CN) .......................... 202010491264.7

(51) Int. Cl.
    *H04W 72/02*          (2009.01)
    *H04W 72/0446*        (2023.01)
            (Continued)
(52) U.S. Cl.
    CPC ....... *H04W 72/02* (2013.01); *H04W 72/0446* (2013.01); *H04W 72/0453* (2013.01); *H04W 72/20* (2023.01)
(58) Field of Classification Search
    CPC ....... H04W 4/40; H04W 72/25; H04W 72/02; H04W 75/56
    See application file for complete search history.

(56) References Cited

U.S. PATENT DOCUMENTS

2016/0338095 A1* 11/2016 Faurie ................... H04W 72/23
2018/0254874 A1*  9/2018 Wang ................... H04L 5/0091
            (Continued)

FOREIGN PATENT DOCUMENTS

CN      110381599 A    10/2019
CN      110958096 A     4/2020
            (Continued)

OTHER PUBLICATIONS

First Office Action for Chinese Application No. 202010491264.7, dated Jan. 4, 2023, 10 Pages.
            (Continued)

*Primary Examiner* — Mahran Y Abu Roumi
(74) *Attorney, Agent, or Firm* — BROOKS KUSHMAN P.C.

(57)          ABSTRACT

This application discloses an information transmission method and apparatus, and a terminal device. The method includes: sending first information to at least one second terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, and the assistance information is used for assisting a third terminal device to select or reserve a resource for data transmission.

16 Claims, 4 Drawing Sheets

Send first information to at least one second terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information ⌇ 101

(51) Int. Cl.
   *H04W 72/0453*        (2023.01)
   *H04W 72/20*          (2023.01)

(56) References Cited

U.S. PATENT DOCUMENTS

| | | | |
|---|---|---|---|
| 2020/0029340 A1* | 1/2020 | He | H04W 72/044 |
| 2020/0052843 A1 | 2/2020 | Cheng et al. | |
| 2021/0029675 A1 | 1/2021 | Ji | |
| 2021/0127413 A1* | 4/2021 | Lu | H04W 72/044 |
| 2021/0212026 A1 | 7/2021 | Peng et al. | |
| 2021/0219320 A1* | 7/2021 | Belleschi | H04W 72/20 |
| 2022/0377783 A1* | 11/2022 | Hu | H04W 72/23 |
| 2023/0038246 A1* | 2/2023 | Dong | H04W 4/70 |
| 2023/0044818 A1* | 2/2023 | Su | H04W 72/40 |

FOREIGN PATENT DOCUMENTS

| | | | |
|---|---|---|---|
| CN | 110972102 A | 4/2020 |
| CN | 111092692 A | 5/2020 |
| WO | 2016181094 A1 | 11/2016 |
| WO | 2017076475 A1 | 5/2017 |

OTHER PUBLICATIONS

Extended European Search Report for Application No. 21818841.5, dated Oct. 16, 2023, 8 Pages.

Moderator Intel Corporation "FL summary #2 of critical issues for 7.2.4.2.2-V2X Mode 2", 3GPP TSG RAN WG1 Meeting #101-E RI-2004715, May 25, 2020 (May 25, 2020), prior agreements on resource allocation, 38 pgs.

International Patent Application No. PCT/CN2021/097638, International Search Report and Written Opinion with Partial English Machine Translation mailed Aug. 27, 2021, 8 pages.

OPPO. Discussion on remaining open issue for mode 2. 3GPP TSG-RAN WG1 Meeting #100e. R1-2000493. Online. Feb.-Mar. 2020. 14 pages.

Fraunhofer HHI, Fraunhofer IIS. Resource Allocation for Mode 2 NR V2X. 3GPP TSG RAN WG1 #99. R1-1912289. Online. Nov. 2019. 9 pages.

First Korean Office Action for Korean Patent Application No. 10-2022-7044531 dated Mar. 17, 2025. 11 pages.

\* cited by examiner

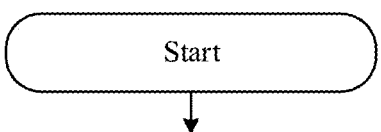

Start

Send first information to at least one second terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information

101

End

FIG. 1

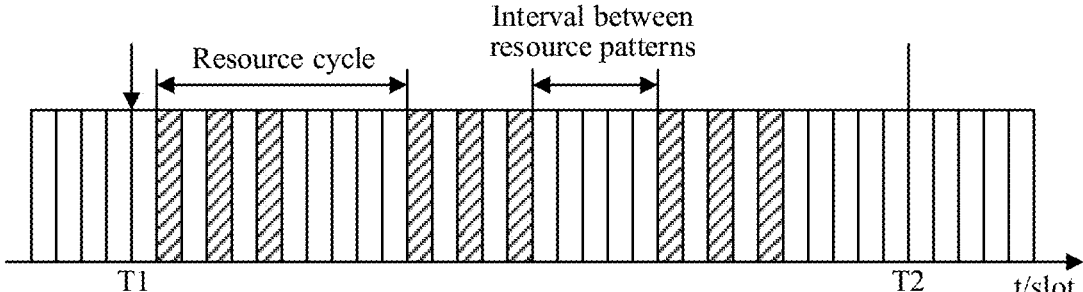

FIG. 2

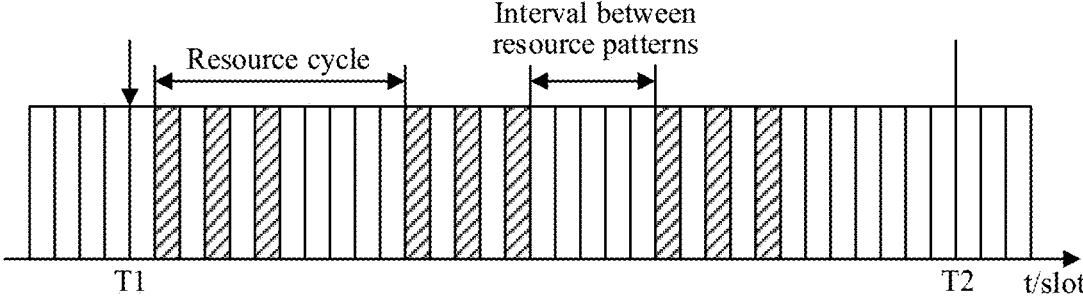

FIG. 3

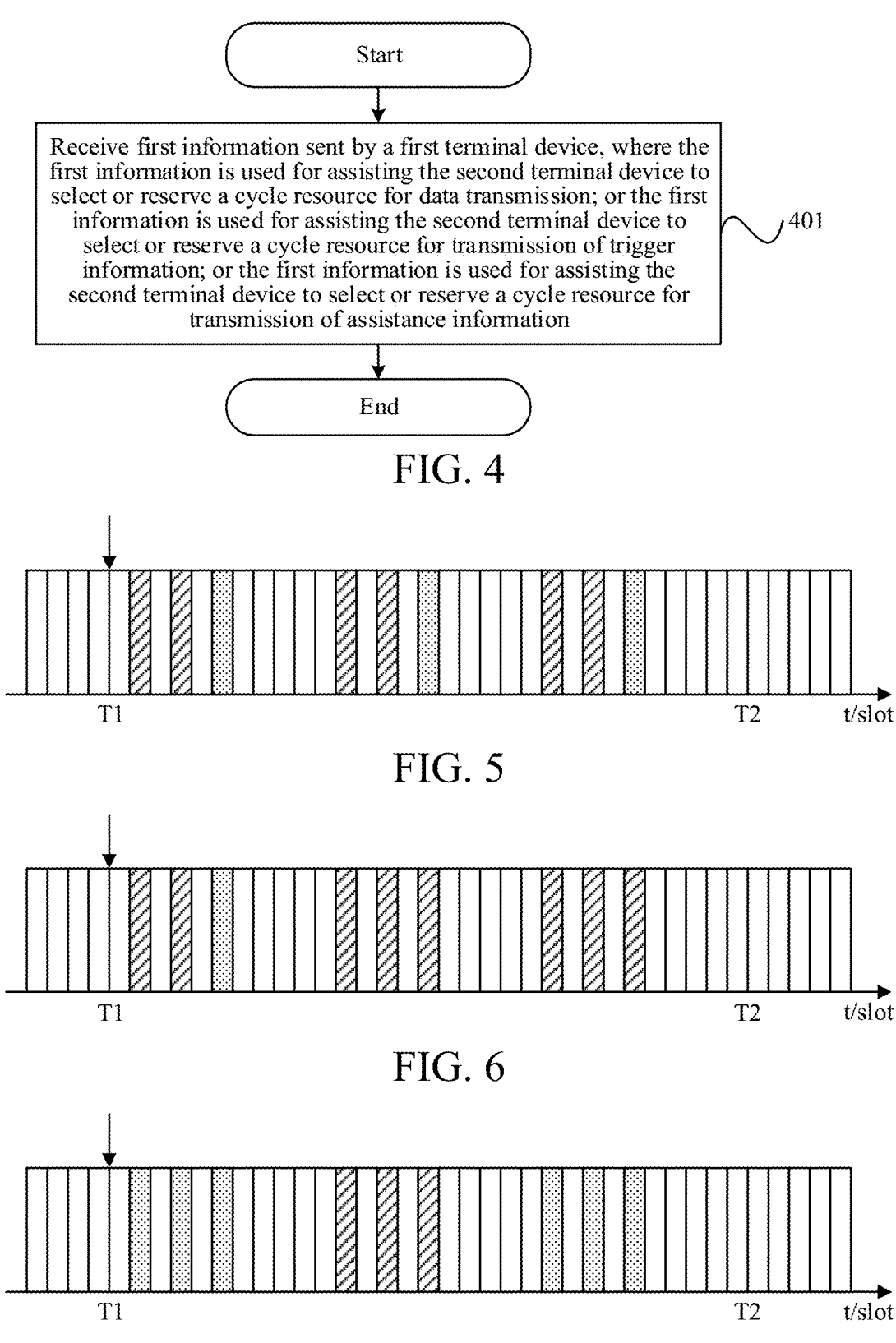

Start

Receive first information sent by a first terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information

401

End

INFORMATION TRANSMISSION METHOD AND APPARATUS, AND TERMINAL DEVICE

CROSS-REFERENCE TO RELATED APPLICATIONS

This application is a continuation of International Application No. PCT/CN2021/097638, filed on Jun. 1, 2021, which claims priority to Chinese Patent Application No. 202010491264.7, filed in China on Jun. 2, 2020, which is incorporated by reference in its entirety.

TECHNICAL FIELD

This application relates to the field of communication technologies, and specifically, to an information transmission method and apparatus, and a terminal device.

BACKGROUND

The new radio (NR) vehicle to everything (V2X) defines two resource allocation patterns, where one is a pattern 1 in which resources are scheduled by base stations; and/or the other one is a pattern 2 in which a terminal independently determines what resources to be used for transmission, and in this case, resource information may come from a broadcast message of a base station or pre-configured information. If a terminal works within a range of a base station and has a radio resource control (RRC) connection with the base station, the terminal can work in the pattern 1 and/or pattern 2. If the terminal works within the range of the base station but has no RRC connection with the base station, the terminal can only work in the pattern 2. If the terminal works outside the range of the base station, the terminal can only work in the pattern 2, and V2X transmission is performed according to pre-configured information.

For the pattern 2, a specific working manner is as follows: 1) After a resource selection is triggered, a transmit terminal first determines a resource selection window, where a lower boundary of the resource selection window is at a T1 time after the resource selection is triggered, and an upper boundary of the resource selection window is at a T2 time after the trigger. T2 is a value selected by an implementation manner of the terminal in a data delay (Packet Delay Budget, PDB) of transport block (TB) transmission of the terminal, and T2 is not earlier than T1. 2) Before the resource selection, the terminal needs to determine a candidate resource set (candidate resource set) for the resource selection, and compares reference signal receiving power (RSRP) measured according to a resource in the resource selection window with a corresponding RSRP threshold. If the RSRP is lower than the RSRP threshold, the resource may be included in the candidate resource set. 3) After the resource set is determined, the terminal randomly selects transmission resources from the candidate resource set. In addition, the terminal may reserve transmission resources for next transmission during current transmission.

The NR V2X supports a chain resource reservation manner, that is, one piece of sidelink control information (SCI) can reserve current resources and can at most reserve two additional resources, and in next resource, two reserved resources may be further indicated. In the selection window, resources may be continuously reserved by using a manner of dynamic reservation.

In a process of implementing this application, the inventor finds that the existing technologies at least have the following problems:

Limited by existing resource allocation manners, the reliability of sidelink transmission is low, such as a problem of hidden nodes of a receiving terminal, and a problem of a half-duplex limitation of the receiving terminal. For example, under the half-duplex limitation, some terminals cannot monitor reserved information of other terminals, resulting in low reliability; and reserved resources of two closer terminals are same because of hidden nodes, resulting in resource collision and low reliability.

SUMMARY

According to a first aspect of this application, an information transmission method, applied to a first terminal device, is provided, which includes:

sending first information to at least one second terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

According to a second aspect of this application, an information transmission method, applied to a second terminal device, is provided, which includes:

receiving first information sent by a first terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

According to a third aspect of this application, an information transmission apparatus, applied to a first terminal device, is provided, which includes:

a first sending module, configured to send first information to at least one second terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

According to a fourth aspect of this application, an information transmission apparatus, applied to a second terminal device, is provided, which includes:

a first receiving module, configured to receive first information sent by a first terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

According to a fifth aspect of this application, a terminal device is provided, which includes a processor, a memory, and a program or instruction stored in the memory and executable on the processor, the program or instruction, when executed by the processor, implementing steps of the method according to the first aspect, or implementing steps of the method according to the second aspect.

According to a sixth aspect of this application, a readable storage medium, storing a program or instruction is provided, the program or instruction, when executed by a processor, implementing steps of the method according to the first aspect, or implementing steps of the method according to the second aspect.

According to a seventh aspect of this application, a chip is provided, which includes: a processor and a communication interface, where the communication interface is coupled to the processor, and the processor is configured to run a program or instruction, to implement the method according to the first aspect, or implement the method according to the second aspect.

BRIEF DESCRIPTION OF THE DRAWINGS

FIG. 1 is a first schematic flowchart of steps of an information transmission method according to an embodiment of this application;

FIG. 2 is an example 1 indicated by a cycle resource in first information of an information transmission method according to an embodiment of this application;

FIG. 3 is an example 2 indicated by a cycle resource in first information of an information transmission method according to an embodiment of this application;

FIG. 4 is a second schematic flowchart of steps of an information transmission method according to an embodiment of this application;

FIG. 5 is an example 3 indicated by a cycle resource in first information of an information transmission method according to an embodiment of this application;

FIG. 6 is an example 4 indicated by a cycle resource in first information of an information transmission method according to an embodiment of this application;

FIG. 7 is an example 5 indicated by a cycle resource in first information of an information transmission method according to an embodiment of this application;

DETAILED DESCRIPTION

Figures 8, 9, 10, 11, 12:
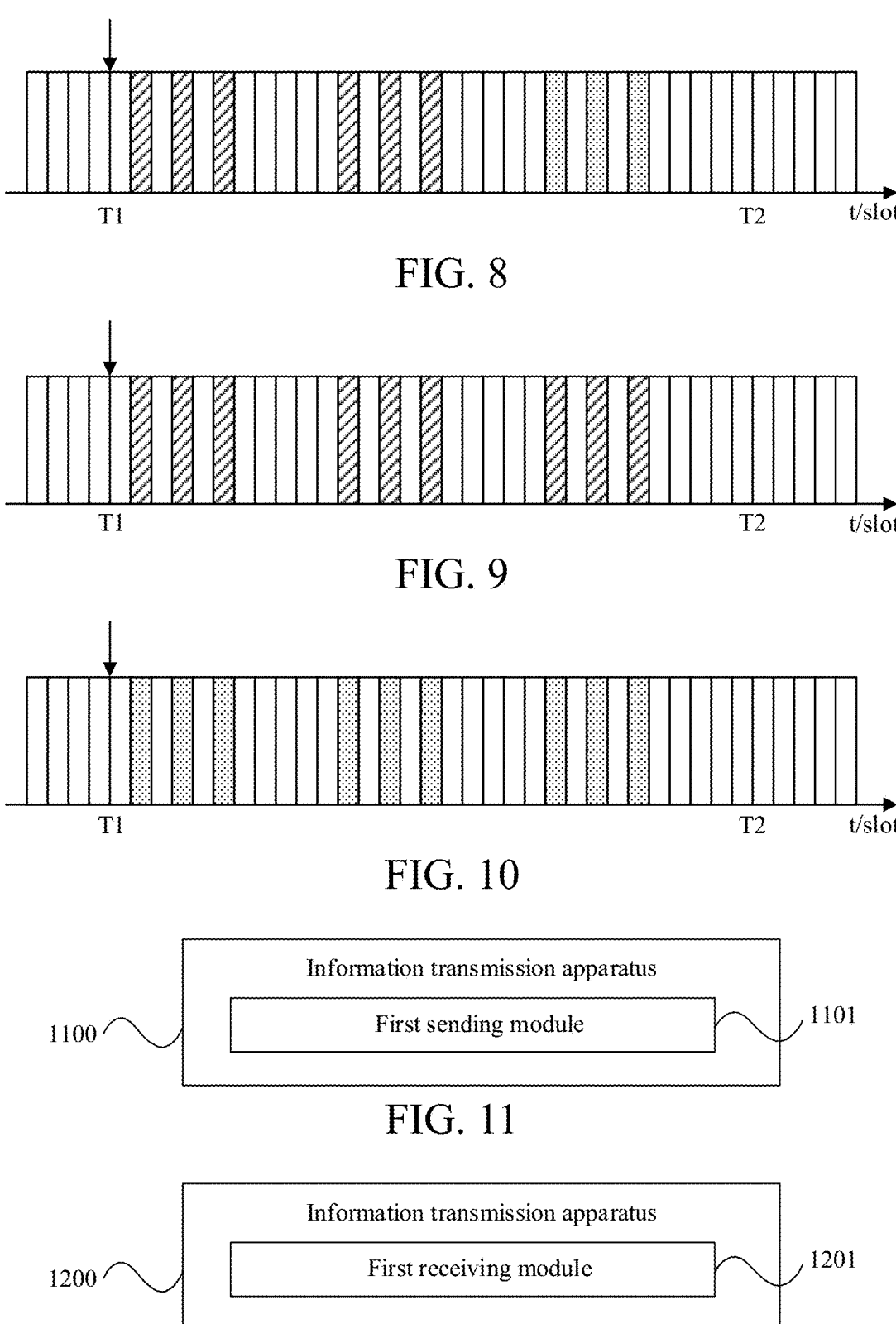
FIG. 8 is an example 6 indicated by a cycle resource in first information of an information transmission method according to an embodiment of this application.
FIG. 9 is an example 7 indicated by a cycle resource in first information of an information transmission method according to an embodiment of this application.
FIG. 10 is an example 8 indicated by a cycle resource in first information of an information transmission method according to an embodiment of this application.
FIG. 11 is a first schematic structural diagram of an information transmission apparatus according to an embodiment of this application.
FIG. 12 is a second schematic structural diagram of an information transmission apparatus according to an embodiment of this application.

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the terms in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" means at least one of the connected objects, and the character "/" generally indicates an "or" relationship between the associated objects.

It should be noted that, the technologies described in the embodiments of this application are not limited to a Long Term Evolution (Long Term Evolution, LTE) system or an LTE-Advanced (LTE-A) system, and can also be used in other wireless communication systems, such as, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application are often used interchangeably, and the described technology can be used not only for the above systems and radio technologies, but also for other systems and radio technologies. However, the following description describes a new radio (NR) system for example objectives, and NR terms are used in most of the description below, although these technologies are also applicable to applications other than NR system applications, such as a 6th generation (6G) communication system.

A terminal device may also be referred to as a terminal or a user terminal (User Equipment, UE). The terminal device may be, for example, a terminal-side device such as a mobile phone, a tablet personal computer (Tablet Personal Computer), a laptop computer (Laptop Computer), a personal digital assistant (PDA), a palmtop computer, a netbook, an ultra-mobile personal computer (UMPC), a mobile Internet device (MID), a wearable device (Wearable Device), an in-vehicle device (VUE), or a pedestrian terminal (PUE). The wearable device includes: a bracelet, earphones, glasses, or the like. It should be noted that, a specific type of the terminal device is not limited the embodiments of this application.

An information transmission method and apparatus, and a terminal device provided in the embodiments of this application are described below through specific embodiments and application scenarios thereof with reference to the accompanying drawings.

As shown in FIG. 1, an embodiment of this application provides an information transmission method, applied to a first terminal device. The method includes the following steps:

Step 101. Send first information to at least one second terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

Optionally, the third terminal device may be the first terminal device or another terminal device, which is not specifically limited herein.

It should be noted that, the cycle resource includes at least one of the following:

a cycle resource with a single resource as a unit; or a cycle resource with a plurality of resources as a unit.

Optionally, when the first information is used for assisting the second terminal device to select or reserve the cycle resource for the data transmission, the first information may be referred to as assistance information, namely, the assistance information used for assisting the terminal device to perform the data transmission.

Alternatively, when the first information is used for assisting the second terminal device to select or reserve the cycle resource for the transmission of the trigger information, the first information may be referred to as assistance information, namely, the assistance information used for assisting the terminal device to perform the transmission of the trigger information.

Alternatively, when the first information is used for triggering the second terminal device to select or reserve the cycle resource for the transmission of the assistance information, the first information may be referred to as trigger information, namely, the trigger information used for triggering the terminal device to perform the transmission of the assistance information.

Alternatively, when the first information is used for assisting the second terminal device to select or reserve the cycle resource for the transmission of the assistance information, the first information may be referred to as assistance information, namely, the assistance information used for assisting the terminal device to perform the transmission of the assistance information.

For a data packet with a large amount of data and strict requirements on reliability and delay, if each data transmission or each transmission of assistance information or each transmission of trigger information needs to be reported by the first information, although the transmission reliability can be improved, the transmission delay is greatly increased, so that a delay requirement of a service cannot be met, and transmission overheads of the first information are also increased. Therefore, in this embodiment of this application, the first terminal device semi-statically sends pieces of the first information to the second terminal devices, and each piece of the first information indicates that the cycle resource is used by the second terminal device to transmit the data or transmit the assistance information or transmit the trigger information, so that problems of a large delay and large overheads caused by each transmission needing assistance of the first information are avoided, and the objective of reducing the data transmission delay and reducing overheads of the assistance information or the trigger information transmission is realized.

As an optional embodiment, the first information includes at least one of the following information:

configuration information of the cycle resource;

resource release indication information;

resource enabling indication information;

sending power information used for the data transmission or the transmission of the trigger information or the transmission of the assistance information;

modulation and coding strategy MCS information used for the data transmission or the transmission of the trigger information or the transmission of the assistance information;

transport block size (TB_size) indication information;

hybrid automatic repeat request HARQ process quantity information used for the data transmission;

HARQ process offset information used for the data transmission;

redundancy version RV configuration information used for the data transmission; or sequence information used for the transmission of the trigger information.

For example, the RV configuration information for the data transmission is described as follows. A full name of the RV is Redundancy Version. For one transport block (TB), there may be N different RVs, each RV includes different data, and each transmission of one TB uses a different RV, so as to improve a retransmission and reception success rate and improve reliability. For a sending terminal used for transmitting the TB, a sending order of the RVs may be adjusted according to a channel condition, a quality of service QoS parameter, and other factors, to achieve the best transmission effect. RV configuration sent by the above data is the sending order of different RVs. Assuming that N is 4, the RVs may be an RV0, an RV1, an RV2, and an RV3, and the RV configuration sent by the data may be (the RV0, the RV1, the RV2, and the RV3), (the RV0, the RV2, the RV1, and the RV3), or the like.

Optionally, in this embodiment of this application, the configuration information of the cycle resource includes at least one of the following:

resource time domain location information;

resource frequency domain location information;

resource time domain offset information;

resource frequency domain offset information;

a resource cycle, namely, a cycle of a resource indicated by the first information;

a time interval between adjacent resource patterns, namely, an interval between cycle resource patterns indicated by the first information, where a cycle resource pattern refers to one cycle resource unit, and one cycle resource unit may be formed by a single resource or a plurality of resources;

a valid duration of the cycle resource, which may also be referred to as a valid duration of the first information, where a receiving terminal of the first information selects or reserves a resource according to the cycle resource indicated by the first information in the valid duration; or a number of times of the cycle resource, namely, a number of times that the resource cycle indicated by the first information occurs.

Optionally, the resource cycle refers to a cycle of the resource indicated by the first information on a time domain. The time interval between the resource patterns (pattern) in the configuration information is defined as follows: the time interval between the resource patterns refers to an interval between resource patterns on the time domain in the resource indicated by the first information. The number of times of the cycle resource in the configuration information refers to a number of times that a resource pattern is indicated. The valid duration in the configuration information refers to a valid time of the first information, which limits a location of the resource indicated by the first information.

As shown in FIG. 2, assuming that the resource indicated by the first information is a resource after a T1 moment, the resource is reserved thrice in one cycle. Shaded parts in FIG. 2 are resources indicated by the first information. The resources indicated by the first information in FIG. 2 take 10 slots as one resource cycle, and first, third, and fifth resources in one cycle are indicated. Therefore, resource distribution indicated in one cycle may be used as one resource pattern (resource pattern). It can be seen from FIG. 2 that, an interval between two resource patterns is 5 slots. The number of times of the cycle resource indicated by the first information refers to a number of times that a cycle resource pattern is indicated. Still using FIG. 2 as an example, a cycle of one cycle resource pattern is 10 slots. If the number of times that the cycle resource is indicated by the first information is 3, the valid time of the first information stops at a T2 moment.

If a length of the valid time is indicated by the first information, as shown in FIG. 3, it is indicated that the valid time of the first information ends at the T2 moment, resources indicated by the assistance information are in a T1 to T2 time period. The cycle resource may be indicated thrice in the T1 to T2 time period according to the cycle of the cycle resource pattern.

As an optional embodiment of this application, the sequence information used for the transmission of the trigger information includes at least one of the following:

a sequence index indication;

a sequence offset indication; or a sequence format indication.

In addition, the first information may further include cyclic prefix information used for the transmission of the trigger information, which includes at least one of the following:

a cyclic prefix index indication;

a cyclic prefix offset indication; or a cyclic prefix configuration indication.

It should be noted that, the above content carried in the first information may also be used for indicating noncyclic resources, and the receiving terminal of the first information may select and reserve a resource according to the noncyclic resources indicated by the first information for data transmission; or the receiving terminal of the first information may perform transmission of assistance information or trigger information according to the noncyclic resources indicated by the first information.

In an aspect, for a carrying manner of the first information, as still another optional embodiment of this application, the first information is carried in target information, and the target information includes at least one of the following:

sidelink control information;

radio resource control information;

sidelink feedback control information;

uplink control information;

uplink data information; or a control unit in a medium access control layer, where the sidelink control information further includes first-level sidelink control information and second-level sidelink control information.

In another aspect, for resources carried in the first information, as another optional embodiment of this application, step 101 includes:

sending, on a first resource, the first information to the at least one second terminal device; and the first resource includes at least one of the following:

a physical sidelink feedback channel;

a physical sidelink data channel;

a physical sidelink control channel;

a physical uplink control channel;

a physical uplink data channel;

a resource in a specific resource pool;

a resource on a specific sub-band in the resource pool;

a resource on a specific symbol in the resource pool; or a resource on a specific sub-frame in the resource pool.

To more clearly describe how to carry the first information in the target information in this embodiment of this application, how to carry various pieces of information included in the first information is described below in detail.

As an optional embodiment, the resource cycle of the cycle resource is indicated by a first indication field in the target information; and each code point in the first indication field respectively corresponds to at least one duration, where the first indication field is an independent indication field, or the first indication field is a jointly encoded indication field. The duration may be L slots (slot) or symbols (symbol) or frames (frame) or sub-frames (sub-frame). The duration may be one of pre-defined or pre-configured length values, or may be one of length values configured by a high layer of each resource pool.

For example, a reserved resource indication field in the first-level sidelink control information may be reused for indicating the resource cycle, and each code point in the reserved resource indication field respectively corresponds to a duration of at least one resource cycle.

Example 1

The resource cycle is indicated by an independent indication field in the first-level sidelink control information or the second-level sidelink control information. Each code point corresponds to one duration, which may be L slots/symbols/frames/sub-frames, and a value of the duration may be one of pre-configured length values, or may be one of length values configured according to each resource pool. For example, a length of the indication field may be 1 bit, and corresponding two code points are 0 and 1 respectively. A resource cycle corresponding to the code point 0 is 10 slots, and a resource cycle corresponding to the code point 1 is 20 slots.

The resource cycle may also be indicated by joint encoding with other indication fields in the first-level sidelink control information and the second-level sidelink control information, for example, may be indicated by joint encoding with a priority indication field in the first-level sidelink control information. The existing priority indication field has 3 bits, and corresponds to eight code points. Without increasing the number of bits, each code point corresponds to one priority and one resource cycle. The information receiving terminal may obtain the resource cycle according to a decoding situation of the priority indication field in the first-level sidelink control information. In addition, the other indication fields also include a frequency domain resource allocation indication field, a time domain resource allocation indication field, a resource reservation cycle indication field, a demodulation reference signal DMRS pattern indication field, a second-level SCI format indication field, a β offset indication field, a DMRS configuration type indication field, a modulation and encoding manner indication field, a hybrid automatic repeat request HARQ process ID indication field, a new data indication NDI indication field, a redundancy version RV indication field, an information source ID (source ID) indication field, an information destination ID (destination ID) indication field, a channel status information CSI requirement indication field, a communication range requirement (communication range requirement) indication field, a zone identifier ID (zone ID) indication field, and the like.

The resource cycle may also be indicated by code points in other indication fields in the first-level sidelink control information and the second-level sidelink control information. For example, in the existing technologies, several code points in a communication range requirement (communication range requirement) indication field in the second-level sidelink control information are useless, and these useless code points may be used for indicating the resource cycle. In addition, the other indication fields also include a frequency domain resource allocation indication field, a time domain resource allocation indication field, a resource reservation cycle indication field, a DMRS pattern indication field, a second-level SCI format indication field, a β offset indication field, a DMRS configuration type indication field, a modulation and encoding manner indication field, a hybrid automatic repeat request HARQ process ID indication field, a new data indication NDI indication field, a redundancy version RV indication field, an information source ID (source ID) indication field, an information destination ID (destination ID) indication field, a channel status information CSI requirement indication field, a communication range requirement (communication range requirement) indication field, a zone identifier ID (zone ID) indication field, and the like.

As an implementation, the independent indication field may reuse the reserved resource indication field in the first-level sidelink control information in the existing technologies, that is, directly indicates the resource cycle in the reserved resource indication field in the first-level sidelink control information.

As another optional embodiment, the valid duration of the cycle resource is indicated by a second indication field in the target information; and each code point in the second indication field respectively corresponds to at least one duration, where the second indication field is an independent indication field, or the second indication field is a jointly encoded indication field. The duration may be L slots (slot) or symbols (symbol) or frames (frame) or sub-frames (sub-frame). The duration may be one of pre-defined or pre-configured length values, or may be one of length values configured by a high layer of each resource pool.

As another optional embodiment, the number of times of the cycle resource is indicated by a third indication field in the target information; and each code point in the third indication field respectively corresponds to at least one count value. The count value may be one of pre-configured count values, or may be one of count values configured by a high layer of each resource pool. The third indication field is an independent indication field, or the third indication field is a jointly encoded indication field.

As still another optional embodiment, the time interval between adjacent resource patterns of the cycle resource is indicated by a fourth indication field in the target information; and each code point in the fourth indication field respectively corresponds to at least one time interval value. The time interval value may be one of pre-configured time values, or may be one of time values configured by a high layer of each resource pool.

The fourth indication field is an independent indication field, or the fourth indication field is a jointly encoded indication field.

Example 2

There may be two forms of indication content of the valid duration of the cycle resource: a valid time of the cycle resource and a number of times that the cycle resource is validly reserved. The two pieces of indication information each may be indicated by an independent indication field in the first-level sidelink control information or the second-level sidelink control information, or may be indicated by joint encoding with other indication fields in the first-level sidelink control information or the second-level sidelink control information, or may be indicated by code points in other indication fields in the first-level sidelink control information or the second-level sidelink control information.

When the valid duration reserved for the cycle resource is indicated by an independent indication field in the first-level sidelink control information or the second-level sidelink control information, each code point corresponds to one duration, which may be L slots/symbols/frames/sub-frames. For example, a length of the indication field may be 1 bit, and corresponding two code points are 0 and 1 respectively. A valid time corresponding to the code point 0 is from a current moment, and resource reservation is performed in future 100 slots. A valid time corresponding to the code point 1 is from a current moment, and resource reservation or selection is performed in future 200 slots.

The valid duration of the cycle resource may also be indicated by joint encoding with other indication fields in the first-level sidelink control information and the second-level sidelink control information, for example, may be indicated by joint encoding with a priority indication field in the first-level sidelink control information. The existing priority indication field has 3 bits, and corresponds to eight code points, and each code point corresponds to one priority and a valid time reserved for one resource. The information receiving terminal may obtain valid time information reserved for the resource according to a decoding situation of the priority indication field in the first-level sidelink control information. In addition, the other indication fields also include a frequency domain resource allocation indication field, a time domain resource allocation indication field, a resource reservation cycle indication field, a DMRS pattern indication field, a second-level SCI format indication field, a β offset indication field, a DMRS configuration type indication field, a modulation and encoding manner indication field, a hybrid automatic repeat request HARQ process ID indication field, a new data indication NDI indication field, a redundancy version RV indication field, an information source ID (source ID) indication field, an information destination ID (destination ID) indication field, a channel status information CSI requirement indication field, a communication range requirement (communication range requirement) indication field, a zone identifier ID (zone ID) indication field, and the like.

The valid duration of the cycle resource may also be indicated by code points in other indication fields in the first-level sidelink control information and the second-level sidelink control information. For example, in the existing technologies, several code points in a communication range requirement (communication range requirement) indication field in the second-level sidelink control information are unused, and these unused code points may be used for indicating valid time information reserved for the resource. In addition, the other indication fields also include a frequency domain resource allocation indication field, a time domain resource allocation indication field, a resource reservation cycle indication field, a DMRS pattern indication field, a second-level SCI format indication field, a β offset indication field, a DMRS configuration type indication field, a modulation and encoding manner indication field, a hybrid automatic repeat request HARQ process ID indication field, a new data indication NDI indication field, a redundancy version RV indication field, an information source ID (source ID) indication field, an information destination ID (destination ID) indication field, a channel status information CSI requirement indication field, a communication range requirement (communication range requirement) indication field, a zone identifier ID (zone ID) indication field, and the like.

Similarly, the number of times of the cycle resource may also use indication manners same as those of the valid duration of the cycle resource.

As another optional embodiment of this application, the method further includes:

determining the configuration information of the cycle resource according to quality of service QoS information of a to-be-transmitted service. The QoS information includes: service delay information, reliability requirement information, a transmission rate requirement, to-be-transmitted data amount information, and the like, which are not specifically limited herein.

The method further includes:

determining the quality of service QoS information of the to-be-transmitted service according to a first manner, where the first manner includes at least one of the following:

determining according to quality of service QoS information of the to-be-transmitted service carried in trigger information sent by a second terminal device for triggering transmission of assistance information;

determining according to quality of service QoS information of the to-be-transmitted service carried in trigger information sent by a control node for triggering transmission of assistance information; or determining according to quality of service QoS information of the to-be-transmitted service carried in trigger information sent by another terminal for triggering transmission of assistance information, where the another terminal is a terminal other than the second terminal.

Example 3

The configuration information of the cycle resource may be obtained by correlating/mapping QoS parameters of data that needs to be transmitted by the receiving terminal of the first information or a sending terminal of the trigger information used for triggering the transmission of the trigger information, and the corresponding QoS parameters may be delay requirement information, priority information, reliability requirement information, a data rate, a transmission rate, to-be-transmitted data amount, and the like of the data that needs to be transmitted. By using a valid time of the cycle resource as an example, when a value of a resource reservation valid time is associated with/mapped to one of QoS parameters of data that needs to be transmitted by a receiving terminal of the assistance information, and is assumed to be associated with/mapped to a delay of the data that needs to be transmitted, the valid time of the cycle resource is t, and the delay of the data that needs to be transmitted is T1, then:

1. t is equal to T1;
2. t is equal to $n*T1$, where n is an integer from 0 to 1;
3. t is equal to T1 to T2, where T2<T1, and T2 is pre-defined or configured by a high layer; and
4. there is a correspondence between the value t of the resource reservation valid time and the delay T1 of the data that needs to be transmitted, for example, a one-to-one correspondence, that is, one t corresponds to one T1. The correspondence may be pre-defined, or may be configured by a high layer (configured by RRC), or may be dynamically configured (configured by sidelink control information SCI/downlink control information DCI/MAC CE).

When the value t of the valid time of the cycle resource is associated with/mapped to a priority, reliability, and a data rate of the data that needs to be transmitted in the QoS parameters; there is a one-to-one correspondence between the value t of the valid time of the cycle resource and the priority, the reliability, and the data rate of the data that needs to be transmitted; and the priority, the reliability, and the data rate of the data that needs to be transmitted by the receiving terminal of the assistance information or the sending terminal of the trigger information used for triggering the transmission of the assistance information are P, C, and V respectively, then one t may correspond to one P, one t may correspond to one C, and one t may correspond to one V. The correspondence may be pre-defined, or may be configured by a high layer (configured by RRC), or may be dynamically configured (configured by SCI/DCI/MAC CE).

The QoS parameters are not limited to the above several types. In addition, the value of the valid time of the cycle resource may also be associated with/mapped to a plurality of QoS parameters. For example, by using the priority and the reliability in the QoS parameters as an example, one priority level and one reliability level may correspond to one resource reservation valid time value. The correspondence may be pre-defined, or may be configured by a high layer (configured by RRC), or may be dynamically configured (configured by SCI/DCI/MAC CE).

As an optional embodiment, the sending power information used for the data transmission or the transmission of the trigger information is indicated by a fifth indication field in the target information; and each code point in the fifth indication field respectively corresponds to at least one sending power value or sending power parameter value. The sending power parameter value may be an alpha value, a PO value, a power scaling factor, a power compensation value, a power step value, a power offset value, or the like. The fifth indication field is an independent indication field, or the fifth indication field is a jointly encoded indication field. The sending power value or the sending power parameter value may be one of pre-configured values, or may be one of values configured by a high layer of each resource pool.

As an optional embodiment, the MCS information used for the data transmission or the transmission of the trigger information is indicated by a sixth indication field in the target information; and each code point in the sixth indication field respectively corresponds to at least one MCS level index value and each MCS level index value corresponds to a modulation order and a code rate, or each code point in the sixth indication field respectively corresponds to at least one MCS table index, where the sixth indication field is an independent indication field, or the sixth indication field is a jointly encoded indication field.

An MCS table may be pre-defined, or may be configured by a high layer of each resource pool. One MCS table may have at least one available MCS level (the modulation order and the code rate).

As an optional embodiment, the HARQ process quantity information used for the data transmission is indicated by a seventh indication field in the target information; and each code point in the seventh indication field respectively corresponds to at least one HARQ process quantity. A value of the HARQ process quantity may be one of pre-configured values.

The seventh indication field is an independent indication field, or the seventh indication field is a jointly encoded indication field.

As an optional embodiment, the HARQ process offset information used for the data transmission is indicated by an eighth indication field in the target information; and each code point in the eighth indication field respectively corresponds to at least one HARQ process offset value. The HARQ process offset value may be one of pre-configured values, or may be one of offset values configured by a high layer of each resource pool.

The eighth indication field is an independent indication field, or the eighth indication field is a jointly encoded indication field.

As an optional embodiment, the RV configuration information used for the data transmission is indicated by a ninth indication field in the target information; and each code point in the ninth indication field respectively corresponds to at least one type of RV configuration, where the ninth indication field is an independent indication field, or the ninth indication field is a jointly encoded indication field. The RV configuration may be one of pre-configured values, or may be one of values configured by a high layer of each resource pool.

As an optional embodiment, the resource release indication information is indicated by a tenth indication field in the target information; and each code point in the tenth indication field respectively corresponds to whether to release the cycle resource, where the tenth indication field is an independent indication field, or the tenth indication field is a jointly encoded indication field.

As another optional embodiment, the resource enabling indication information is indicated by an eleventh indication field in the target information; and each code point in the eleventh indication field respectively corresponds to whether to enable the cycle resource, where the eleventh indication field is an independent indication field, or the eleventh indication field is a jointly encoded indication field.

As an optional embodiment, the transport block size indication information is indicated by a twelfth indication field in the target information; and each code point in the twelfth indication field respectively corresponds to at least one transport block size value. The transport block size value may be one of pre-configured values, or may be one of transport block size values configured by a high layer of each resource pool.

The twelfth indication field is an independent indication field, or the twelfth indication field is a jointly encoded indication field.

As an optional embodiment, the sequence information used for the transmission of the trigger information is indicated by a thirteenth indication field in the target information; and each code point in the thirteenth indication field respectively corresponds to at least one sequence index value or at least one sequence offset value or at least one sequence format. The sequence index value or the sequence offset value or the sequence format may be one of pre-configured values, or may be one of sequence index values or sequence offset values or sequence formats configured by a high layer of each resource pool.

The thirteenth indication field is an independent indication field, or the thirteenth indication field is a jointly encoded indication field.

In summary, in this embodiment of this application, a first terminal device sends first information to at least one second terminal device, and the first information assists the second terminal device to select (or reserve) a cycle resource for transmission of data or trigger information or assistance information, which can resolve the problems of a large data transmission delay and large transmission overheads of the assistance information or the trigger information, thereby reducing the data transmission delay and reducing the transmission overheads of the assistance information or the trigger information.

As shown in FIG. 4, an embodiment of this application further provides an information transmission method, applied to a second terminal device. The method includes the following steps.

Step 401. Receive first information sent by a first terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

It should be noted that, the cycle resource includes at least one of the following:

a cycle resource with a single resource as a unit; or
a cycle resource with a plurality of resources as a unit.

Optionally, when the first information is used for assisting the second terminal device to select or reserve the cycle resource for the data transmission, the first information may be referred to as assistance information, namely, the assistance information used for assisting the terminal device to perform the data transmission.

Alternatively, when the first information is used for assisting the second terminal device to select or reserve the cycle resource for the transmission of the trigger information, the first information may be referred to as assistance information, namely, the assistance information used for assisting the terminal device to perform the transmission of the trigger information.

Alternatively, when the first information is used for assisting the second terminal device to select or reserve the cycle resource for the transmission of the assistance information, the first information may be referred to as trigger information, namely, the trigger information used for triggering the terminal device to perform the transmission of the assistance information.

Alternatively, when the first information is used for assisting the second terminal device to select or reserve the cycle resource for the transmission of the assistance information, the first information may be referred to as assistance information, namely, the assistance information used for assisting the terminal device to perform the transmission of the assistance information.

For a data packet with a large amount of data and strict requirements on reliability and delay, if each data transmission or each transmission of assistance information or each transmission of trigger information needs to be reported by the first information, although the transmission reliability can be improved, the transmission delay is greatly increased, so that a delay requirement of a service cannot be met, and transmission overheads of the first information are also increased. Therefore, in this embodiment of this application, the first terminal device semi-statically sends pieces of the first information to the second terminal devices, and each piece of the first information indicates that the cycle resource is used by the second terminal device to transmit the data or transmit the assistance information or transmit the trigger information, so that problems of a large delay and large overheads caused by each transmission needing assistance of the first information are avoided, and the objective of reducing the data transmission delay and reducing overheads of the assistance information or the trigger information transmission is realized.

As an optional embodiment, the first information includes at least one of the following information:

configuration information of the cycle resource;
resource release indication information;
resource enabling indication information;
sending power information used for the data transmission or the transmission of the trigger information or the transmission of the assistance information;

modulation and coding strategy MCS information used for the data transmission or the transmission of the trigger information or the transmission of the assistance information;
transport block size (TB_size) indication information;
hybrid automatic repeat request HARQ process quantity information used for the data transmission;
HARQ process offset information used for the data transmission;
redundancy version RV configuration information used for the data transmission; or
sequence information used for the transmission of the trigger information.

For example, the RV configuration information for the data transmission is described as follows. A full name of the RV is Redundancy Version. For one transport block (TB), there may be N different RVs, each RV includes different data, and each transmission of one TB uses a different RV, so as to improve a retransmission and reception success rate and improve reliability. For a sending terminal used for transmitting the TB, a sending order of the RVs may be adjusted according to a channel condition, a quality of service QoS parameter, and other factors, to achieve the best transmission effect. RV configuration sent by the above data is the sending order of different RVs. Assuming that N is 4, the RVs may be an RV0, an RV1, an RV2, and an RV3, and the RV configuration sent by the data may be (the RV0, the RV1, the RV2, and the RV3), (the RV0, the RV2, the RV1, and the RV3), or the like.

Optionally, in this embodiment of this application, the configuration information of the cycle resource includes at least one of the following:

resource time domain location information;
resource frequency domain location information;
resource time domain offset information;
resource frequency domain offset information;
a resource cycle; namely, a cycle of a resource indicated by the first information;
a time interval between adjacent resource patterns, namely, an interval between cycle resource patterns indicated by the first information, where a cycle resource pattern refers to one cycle resource unit, and one cycle resource unit may be formed by a single resource or a plurality of resources;
a valid duration of the cycle resource, which may also be referred to as a valid duration of the first information, where a receiving terminal of the first information selects or reserves a resource according to the cycle resource indicated by the first information in the valid duration; or
a number of times of the cycle resource, namely, a number of times that the resource cycle indicated by the first information occurs.

Optionally, the resource cycle refers to a cycle of the resource indicated by the first information on a time domain. The time interval between the resource patterns (pattern) in the configuration information is defined as follows: the time interval between the resource patterns refers to an interval between resource patterns on the time domain in the resource indicated by the first information. The number of times of the cycle resource in the configuration information refers to a number of times that a resource pattern is indicated. The valid duration in the configuration information refers to a valid time of the first information, which limits a location of the resource indicated by the first information.

As shown in FIG. 2, assuming that the resource indicated by the first information is a resource after a T1 moment, the resource is reserved thrice in one cycle. Shaded parts in FIG. 2 are resources indicated by the first information. The resources indicated by the first information in FIG. 2 take 10 slots as one resource cycle, and first, third, and fifth resources in one cycle are indicated. Therefore, resource distribution indicated in one cycle may be used as one resource pattern (resource pattern). It can be seen from FIG. 2 that, an interval between two resource patterns is 5 slots. The number of times of the cycle resource indicated by the first information refers to a number of times that a cycle resource pattern is indicated. Still using FIG. 2 as an example, a cycle of one cycle resource pattern is 10 slots. If the number of times that the cycle resource is indicated by the first information is 3, the valid time of the first information stops at a T2 moment.

If a length of the valid time is indicated by the first information, as shown in FIG. 3, it is indicated that the valid time of the first information ends at the T2 moment, resources indicated by the assistance information are in a T1 to T2 time period. The cycle resource may be indicated thrice in the T1 to T2 time period according to the cycle of the cycle resource pattern.

As an optional embodiment of this application, the sequence information used for the transmission of the trigger information includes at least one of the following:

a sequence index indication;

a sequence offset indication; or a sequence format indication.

In addition, the first information may further include cyclic prefix information used for the transmission of the trigger information, which includes at least one of the following:

a cyclic prefix index indication;

a cyclic prefix offset indication; or a cyclic prefix configuration indication.

It should be noted that, the above content carried in the first information may also be used for indicating noncyclic resources, and the receiving terminal of the first information may select and reserve a resource according to the noncyclic resources indicated by the first information for data transmission; or the receiving terminal of the first information may perform transmission of assistance information or trigger information according to the noncyclic resources indicated by the first information.

In an aspect, for a carrying manner of the first information, as still another optional embodiment of this application, the first information is carried in target information, and the target information includes at least one of the following:

sidelink control information;

radio resource control information;

sidelink feedback control information;

uplink control information;

uplink data information; or a control unit in a medium access control layer, where the sidelink control information further includes first-level sidelink control information and second-level sidelink control information.

In another aspect, for resources carried in the first information, as another optional embodiment of this application, step 101 includes:

sending, on a first resource, the first information to the at least one second terminal device; and the first resource includes at least one of the following:

a physical sidelink feedback channel;

a physical sidelink data channel;

a physical sidelink control channel;

a physical uplink control channel;

a physical uplink data channel;

a resource in a specific resource pool;

a resource on a specific sub-band in the resource pool;

a resource on a specific symbol in the resource pool; or a resource on a specific sub-frame in the resource pool.

To more clearly describe how to carry the first information in the target information in this embodiment of this application, how to carry various pieces of information included in the first information is described below in detail.

As an optional embodiment, the resource cycle of the cycle resource is indicated by a first indication field in the target information; and each code point in the first indication field respectively corresponds to at least one duration, where the first indication field is an independent indication field, or the first indication field is a jointly encoded indication field. The duration may be L slots (slot) or symbols (symbol) or frames (frame) or sub-frames (sub-frame). The duration may be one of pre-defined or pre-configured length values, or may be one of length values configured by a high layer of each resource pool.

For example, a reserved resource indication field in the first-level sidelink control information may be reused for indicating the resource cycle, and each code point in the reserved resource indication field respectively corresponds to a duration of at least one resource cycle.

As another optional embodiment, the valid duration of the cycle resource is indicated by a second indication field in the target information; and each code point in the second indication field respectively corresponds to at least one duration, where the second indication field is an independent indication field, or the second indication field is a jointly encoded indication field. The duration may be L slots (slot) or symbols (symbol) or frames (frame) or sub-frames (sub-frame). The duration may be one of pre-defined or pre-configured length values, or may be one of length values configured by a high layer of each resource pool.

As another optional embodiment, the number of times of the cycle resource is indicated by a third indication field in the target information; and each code point in the third indication field respectively corresponds to at least one count value. The count value may be one of pre-configured count values, or may be pre-defined as one of count values configured according to each resource pool. The third indication field is an independent indication field, or the third indication field is a jointly encoded indication field.

As still another optional embodiment, the time interval between adjacent resource patterns of the cycle resource is indicated by a fourth indication field in the target information; and each code point in the fourth indication field respectively corresponds to at least one time interval value. The time interval value may be one of pre-configured time values, or may be one of time values configured by a high layer of each resource pool.

The fourth indication field is an independent indication field, or the fourth indication field is a jointly encoded indication field.

As an optional embodiment, the sending power information used for the data transmission or the transmission of the trigger information is indicated by a fifth indication field in the target information; and each code point in the fifth indication field respectively corresponds to at least one sending power value or sending power parameter value. The sending power parameter value may be an alpha value, a PO value, a power scaling factor, a power compensation value, a power step value, a power offset value, or the like. The fifth indication field is an independent indication field, or the fifth indication field is a jointly encoded indication field. The sending power value or the sending power parameter value may be one of pre-configured values, or may be one of values configured by a high layer of each resource pool.

As an optional embodiment, the MCS information used for the data transmission or the transmission of the trigger information is indicated by a sixth indication field in the target information; and each code point in the sixth indication field respectively corresponds to at least one MCS level index value and each MCS level index value corresponds to a modulation order and a code rate, or each code point in the sixth indication field respectively corresponds to at least one MCS table index, where the sixth indication field is an independent indication field, or the sixth indication field is a jointly encoded indication field.

An MCS table may be pre-defined, or may be configured according to a high layer of each resource pool. One MCS table may have at least one available MCS level (the modulation order and the code rate).

As an optional embodiment, the HARQ process quantity information used for the data transmission is indicated by a seventh indication field in the target information; and each code point in the seventh indication field respectively corresponds to at least one HARQ process quantity. A value of the HARQ process quantity may be one of pre-configured values, or may be one of values configured by a high layer of each resource pool.

The seventh indication field is an independent indication field, or the seventh indication field is a jointly encoded indication field.

As an optional embodiment, the HARQ process offset information used for the data transmission is indicated by an eighth indication field in the target information; and each code point in the eighth indication field respectively corresponds to at least one HARQ process offset value. The HARQ process offset value may be one of pre-configured values, or may be one of offset values configured by a high layer of each resource pool.

The eighth indication field is an independent indication field, or the eighth indication field is a jointly encoded indication field.

As an optional embodiment, the RV configuration information used for the data transmission is indicated by a ninth indication field in the target information; and each code point in the ninth indication field respectively corresponds to at least one type of RV configuration, where the ninth indication field is an independent indication field, or the ninth indication field is a jointly encoded indication field. The RV configuration may be one of pre-configured values, or may be one of values configured by a high layer of each resource pool.

As an optional embodiment, the resource release indication information is indicated by a tenth indication field in the target information; and each code point in the tenth indication field respectively corresponds to whether to release cycle resource, where the tenth indication field is an independent indication field, or the tenth indication field is a jointly encoded indication field.

As another optional embodiment, the resource enabling indication information is indicated by an eleventh indication field in the target information; and each code point in the eleventh indication field respectively corresponds to whether to enable the cycle resource, where the eleventh indication field is an independent indication field, or the eleventh indication field is a jointly encoded indication field.

As an optional embodiment, the transport block size indication information is indicated by a twelfth indication field in the target information; and each code point in the twelfth indication field respectively corresponds to at least one transport block size value. The transport block size value may be one of pre-configured values, or may be one of transport block size values configured by a high layer of each resource pool.

The twelfth indication field is an independent indication field, or the twelfth indication field is a jointly encoded indication field.

As an optional embodiment, the sequence information used for the transmission of the trigger information is indicated by a thirteenth indication field in the target information; and each code point in the thirteenth indication field respectively corresponds to at least one sequence index value or at least one sequence offset value or at least one sequence format. The sequence index value or the sequence offset value or the sequence format may be one of pre-configured values, or may be one of sequence index values or sequence offset values or sequence formats configured by a high layer of each resource pool.

The thirteenth indication field is an independent indication field, or the thirteenth indication field is a jointly encoded indication field.

As an optional embodiment, the method further includes:

selecting or reserving, according to the first information, the cycle resources indicated by the first information for the data transmission or the transmission of the trigger information or the transmission of the assistance information; and performing the data transmission or the transmission of the trigger information or the transmission of the assistance information on the cycle resources.

The cycle resources indicated by the first information include at least one of the following:

a cycle resource determined according to the resource time domain location information and the resource frequency domain location information included in the first information;

a cycle resource determined according to the resource time domain location information, the resource frequency domain location information, the resource time domain offset information, and the resource frequency domain offset information included in the first information;

a cycle resource determined according to the resource time domain location information, the resource frequency domain location information, and the resource cycle included in the first information;

a cycle resource determined according to the resource time domain location information, the resource frequency domain location information, the resource time domain offset information, the resource frequency domain offset information, and the resource cycle included in the first information;

a cycle resource determined according to the resource time domain location information, the resource frequency domain location information, the number of times of the cycle resource, and the resource cycle included in the first information;

a cycle resource determined according to the resource time domain location information, the resource frequency domain location information, the resource time domain offset information, the resource frequency domain offset information, the number of times of the cycle resource, and the resource cycle included in the first information;

a cycle resource determined according to the resource time domain location information, the resource frequency domain location information, the valid duration of the cycle resource, and the resource cycle included in the first information;

a cycle resource determined according to the resource time domain location information, the resource frequency domain location information, the resource time domain offset information, the resource frequency domain offset information, the valid duration of the cycle resource, and the resource cycle included in the first information;

a cycle resource determined according to the resource time domain location information, the resource frequency domain location information, and the time interval between adjacent resource patterns included in the first information;

a cycle resource determined according to the resource time domain location information, the resource frequency domain location information, the resource time domain offset information, the resource frequency domain offset information, and the time interval between adjacent resource patterns included in the first information;

a cycle resource determined according to the resource time domain location information, the resource frequency domain location information, the number of times of the cycle resource, and the time interval between adjacent resource patterns included in the first information;

a cycle resource determined according to the resource time domain location information, the resource frequency domain location information, the resource time domain offset information, the resource frequency domain offset information, the number of times of the cycle resource, and the time interval between adjacent resource patterns included in the first information;

a cycle resource determined according to the resource time domain location information, the resource frequency domain location information, the valid duration of the cycle resource, and the time interval between adjacent resource patterns included in the first information; or a cycle resource determined according to the resource time domain location information, the resource frequency domain location information, the resource time domain offset information, the resource frequency domain offset information, the valid duration of the cycle resource, and the time interval between adjacent resource patterns included in the first information.

As another optional embodiment, during the performing the data transmission or the transmission of the trigger information or the transmission of the assistance information on the cycle resources, the method further includes:

sending second information, where the second information includes a fourteenth indication field used for indicating reserved resource location information; and the fourteenth indication field is an independent indication field, or the fourteenth indication field is a jointly encoded indication field; and each code point in the fourteenth indication field respectively corresponds to at least one of the following:

an $n1^{th}$ resource or m1 resources in at least one cycle in the cycle resources indicated by the first information, and an $n1^{th}$ resource or m1 resources reserved in other cycles;

an $n2^{th}$ resource or m2 resources in at least one cycle in the cycle resources indicated by the first information, where all resources are reserved in other cycles;

resources in an $n3^{th}$ cycle in the cycle resources indicated by the first information;

resources in m3 cycles in the cycle resources indicated by the first information;

all cycle resources indicated by the first information being reserved; or the cycle resources indicated by the first information being not reserved, where n1, n2, n3, m1, m2, and m3 are respectively positive integers.

Example 4

When a receiving terminal of the first information performs data transmission, an actual reserved resource location information is carried by using an independent indication field or joint encoding with other indication fields in 1st/2nd stage SCI, and expression meanings of each code point include at least one of the following:

as shown in FIG. 5, an $n1^{th}$ resource or m1 resources in one cycle in the cycle resources indicated by the first information, where the resources are only used in subsequent cycle resources;

as shown in FIG. 6, an $n2^{th}$ resource or m2 resources in a specific cycle in the cycle resources indicated by the first information, where all resources are reserved in other cycles cycle;

as shown in FIG. 7, resources in an $n3^{th}$ cycle in the cycle resources indicated by the first information being reserved;

as shown in FIG. 8, resources in several cycles in the cycle resources indicated by the first information being reserved;

as shown in FIG. 9, for a special situation, one special code point corresponding that all resources indicated by the assistance information are reserved; or as shown in FIG. 10, for a special situation, one special code point corresponding that all resources indicated by the assistance information are not reserved.

For FIG. 5 to FIG. 10, resources corresponding to ▦ are resources indicated by the first information but not selected or reserved, and resources corresponding to ▨ are resources actually selected or reserved by the receiving terminal of the first information according to the resources indicated by the first information.

Alternatively, the method may further include:

sending third information, where the third information includes a fifteenth indication field used for indicating reserved resource cycle information, each code point in the fifteenth indication field respectively corresponds to a different duration, and the fifteenth indication field is an independent indication field, or the fifteenth indication field is a jointly encoded indication field.

An implementation is that resource reservation cycle information is indicated by a reserved resource indication field in the first-level sidelink control information. Alternatively, the field is set as an index or a value corresponding to the cycle.

It should be noted that, the above second information and third information may be same information or different information, which is not specifically limited herein. As an implementation, the second information and the third information may be carried in the sidelink control information, sidelink data information, the sidelink feedback control information, the downlink control information, the uplink control information, the RRC information, and the MAC CE.

Optionally, in the above embodiments of this application, the method further includes:

determining, according to the transport block size indication information and/or the MCS indication information included in the first information, a size of a transport block for the data transmission or the transmission of the trigger information for triggering the transmission of the assistance information.

As an optional embodiment of this application, the method further includes:

receiving the first information sent by the first terminal (where the first information may also be referred to as next first information); and releasing the selected or reserved cycle resources based on the first information, or enabling, based on the first information, cycle resources selected or reserved according to at least one piece of closest first information.

Alternatively, the method may further include:

releasing, in a case that resource release indication information sent by the first terminal device is received, resources selected or reserved according to the cycle resources indicated by the first information;

and/or enabling, in a case that resource enabling indication information sent by the first terminal device is received, the resources selected or reserved according to the cycle resources indicated by the first information.

The resource release indication information and/or the resource enabling indication information are carried in at least one of the following information:

the first information;

sidelink control information (first-level sidelink control information and/or second-level sidelink control information);

sidelink feedback control information;

radio resource control information;

a control unit in a medium access control layer;

uplink control information; or downlink control information.

Example 5

When the cycle resource indicated by the first information is a resource in a specific channel or a specific resource pool or a specific sub-band or a specific symbol or a specific BWP, the resource is dedicated to transmitting the trigger information used for triggering the transmission of the assistance information. For example, the cycle resource may be a resource in the physical sidelink feedback channel (PSFCH), and the trigger information is carried through an SR/BSR and transmitted in the PSFCH. Sending parameters of the scheduling request (Scheduling Request, SR)/buffer status report (Buffer Status Report, BSR), such as sequence information, a sequence offset value, cyclic prefix information, and the like used for sending, are obtained through indication of the assistance information, where SR/BSR may only carry trigger information with one bit, or may carry information with a plurality of bits (including to-be-transmitted service information: to-be-transmitted data amount, a transmission code rate, a delay requirement, and other QoS parameters).

When a resource reserved in the first information is a resource in the physical sidelink shared channel (PSSCH), the trigger information is carried in the physical sidelink control channel (PSCCH) through the SR/BSR for transmission, and the SR/BSR may be indicated through one or more indication fields in the first-level sidelink control information or the second-level sidelink control information. The PSSCH may carry the to-be-transmitted service information: the to-be-transmitted data amount, the transmission code rate, the delay requirement, and other QoS parameters.

In summary, in this embodiment of this application, a first terminal device sends first information to at least one second terminal device, and the first information assists the second terminal device to select (or reserve) a cycle resource for transmission of data or trigger information or assistance information, which can resolve the problems of a large data transmission delay and large transmission overheads of the assistance information or the trigger information, thereby reducing the data transmission delay and reducing the transmission overheads of the assistance information or the trigger information. In addition, modifications of existing resource allocation solutions and modifications at a signaling level are small, thereby having good compatibility.

It should be noted that, in the information transmission method provided in the embodiments of this application, an execution entity may be an information transmission apparatus, or a control module configured to execute and load the information transmission method in the information transmission apparatus. In this embodiment of this application, an example in which the information transmission apparatus executes and loads the information transmission method is used to describe the information transmission apparatus provided in the embodiments of this application.

In the embodiments of this application, some modifications are made based on original resource allocation, and modifications at a signaling level are small, thereby having good compatibility, and also improving transmission reliability. A resource reservation cycle indication field (used for indicating a cycle resource) is introduced in this solution. As an implementation, the field can also reuse a resource reservation cycle indication field in first-level sidelink control information in the existing technologies, and also have good compatibility. In addition, a newly introduced valid time of the cycle resource or valid count indication field of the cycle resource can indicate a specific location of a resource used by a receiving terminal of first information for data transmission, thereby reducing a waste of a reserved resource of the cycle resource, and improving the reliability of data transmission.

As shown in FIG. 11, an embodiment of this application further provides an information transmission apparatus 1100, applied to a first terminal device. The apparatus includes:

a first sending module 1101, configured to send first information to at least one second terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

As an optional embodiment, the first information includes at least one of the following information:

configuration information of the cycle resource;

resource release indication information;

resource enabling indication information;

sending power information used for the data transmission or the transmission of the trigger information;

modulation and coding strategy MCS information used for the data transmission or the transmission of the trigger information;

transport block size indication information;

hybrid automatic repeat request HARQ process quantity information used for the data transmission;

HARQ process offset information used for the data transmission;

redundancy version RV configuration information used for the data transmission; or sequence information used for the transmission of the trigger information.

As an optional embodiment, the configuration information of the cycle resource includes at least one of the following:

resource time domain location information;

resource frequency domain location information;

resource time domain offset information;

resource frequency domain offset information;

a resource cycle;

a time interval between adjacent resource patterns, a valid duration of the cycle resource; or a number of times of the cycle resource.

As an optional embodiment, the sequence information used for the transmission of the trigger information includes at least one of the following:

a sequence index indication;

a sequence offset indication; or a sequence format indication.

As an optional embodiment, the first information is carried in target information, and the target information includes at least one of the following:

sidelink control information;

radio resource control information;

sidelink feedback control information;

uplink control information;

uplink data information; or a control unit in a medium access control layer, where the sidelink control information further includes first-level sidelink control information and second-level sidelink control information.

As an optional embodiment, the first sending module includes:

a first sending sub-module, configured to send, on a first resource, the first information to the at least one second terminal device; and the first resource includes at least one of the following:

a physical sidelink feedback channel;

a physical sidelink data channel;

a physical sidelink control channel;

a physical uplink control channel;

a physical uplink data channel;

a resource in a specific resource pool;

a resource on a specific sub-band in the resource pool;

a resource on a specific symbol in the resource pool; or a resource on a specific sub-frame in the resource pool.

As an optional embodiment, the resource cycle of the cycle resource is indicated by a first indication field in the target information; and each code point in the first indication field respectively corresponds to at least one duration, where the first indication field is an independent indication field, or the first indication field is a jointly encoded indication field.

As an optional embodiment, the valid duration of the cycle resource is indicated by a second indication field in the target information; and each code point in the second indication field respectively corresponds to at least one duration, where the second indication field is an independent indication field, or the second indication field is a jointly encoded indication field.

As an optional embodiment, the number of times of the cycle resource is indicated by a third indication field in the target information; and each code point in the third indication field respectively corresponds to at least one count value, where the third indication field is an independent indication field, or the third indication field is a jointly encoded indication field.

As an optional embodiment, the time interval between adjacent resource patterns of the cycle resource is indicated by a fourth indication field in the target information; and each code point in the fourth indication field respectively corresponds to at least one time interval value, where the fourth indication field is an independent indication field, or the fourth indication field is a jointly encoded indication field.

As an optional embodiment, the apparatus further includes:

a first information determining module, configured to determine the configuration information of the cycle resource according to quality of service QoS information of a to-be-transmitted service.

As an optional embodiment, the apparatus further includes:

a second information determining module, configured to determine the quality of service QoS information of the to-be-transmitted service according to a first manner, where the first manner includes at least one of the following:

determining according to quality of service QoS information of the to-be-transmitted service carried in trigger information sent by a second terminal device for triggering transmission of assistance information;

determining according to quality of service QoS information of the to-be-transmitted service carried in trigger information sent by a control node for triggering transmission of assistance information; or determining according to quality of service QoS information of the to-be-transmitted service carried in trigger information sent by another terminal for triggering transmission of assistance information, where the another terminal is a terminal other than the second terminal.

As an optional embodiment, the sending power information used for the data transmission or the transmission of the trigger information or the transmission of the assistance information is indicated by a fifth indication field in the target information; and each code point in the fifth indication field respectively corresponds to at least one sending power value or sending power parameter value, where the fifth indication field is an independent indication field, or the fifth indication field is a jointly encoded indication field.

As an optional embodiment, the MCS information used for the data transmission or the transmission of the trigger information or the transmission of the assistance information is indicated by a sixth indication field in the target information; and each code point in the sixth indication field respectively corresponds to at least one MCS level index value and each MCS level index value corresponds to a modulation order and a code rate, or each code point in the sixth indication field respectively corresponds to at least one MCS table index, where the sixth indication field is an independent indication field, or the sixth indication field is a jointly encoded indication field.

As an optional embodiment, the HARQ process quantity information used for the data transmission is indicated by a seventh indication field in the target information; and each code point in the seventh indication field respectively corresponds to at least one HARQ process quantity, where the seventh indication field is an independent indication field, or the seventh indication field is a jointly encoded indication field.

As an optional embodiment, the HARQ process offset information used for the data transmission is indicated by an eighth indication field in the target information; and each code point in the eighth indication field respectively corresponds to at least one HARQ process offset value, where the eighth indication field is an independent indication field, or the eighth indication field is a jointly encoded indication field.

As an optional embodiment, the RV configuration information used for the data transmission is indicated by a ninth indication field in the target information; and each code point in the ninth indication field respectively corresponds to at least one type of RV configuration, where the ninth indication field is an independent indication field, or the ninth indication field is a jointly encoded indication field.

As an optional embodiment, the resource release indication information is indicated by a tenth indication field in the target information; and each code point in the tenth indication field respectively corresponds to whether to release the cycle resource, where the tenth indication field is an independent indication field, or the tenth indication field is a jointly encoded indication field.

As an optional embodiment, the resource enabling indication information is indicated by an eleventh indication field in the target information; and each code point in the eleventh indication field respectively corresponds to whether to enable the cycle resource, where the eleventh indication field is an independent indication field, or the eleventh indication field is a jointly encoded indication field.

As an optional embodiment, the transport block size indication information is indicated by a twelfth indication field in the target information; and each code point in the twelfth indication field respectively corresponds to at least one transport block size value, where the twelfth indication field is an independent indication field, or the twelfth indication field is a jointly encoded indication field.

As an optional embodiment, the sequence information used for the transmission of the trigger information is indicated by a thirteenth indication field in the target information; and each code point in the thirteenth indication field respectively corresponds to at least one sequence index value or at least one sequence offset value or at least one sequence format, where the thirteenth indication field is an independent indication field, or the thirteenth indication field is a jointly encoded indication field.

In this embodiment of this application, a first terminal device sends first information to at least one second terminal device, and the first information assists the second terminal device to select (or reserve) a cycle resource for transmission of data or trigger information or assistance information, which can resolve the problems of a large data transmission delay and large transmission overheads of the assistance information or the trigger information, thereby reducing the data transmission delay and reducing the transmission overheads of the assistance information or the trigger information. In addition, modifications of existing resource allocation solutions and modifications at a signaling level are small, thereby having good compatibility.

It should be noted that, the information transmission apparatus provided in this embodiment of this application is an information transmission apparatus that can execute the above information transmission method, and all embodiments of the above information transmission method are applicable to the apparatus, and can achieve same or similar beneficial effects.

As shown in FIG. 12, an embodiment of this application further provides an information transmission apparatus 1200, applied to a second terminal device. The apparatus includes:

a first receiving module 1201, configured to receive first information sent by a first terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

As an optional embodiment, the first information includes at least one of the following information:

configuration information of the cycle resource;

resource release indication information;

resource enabling indication information;

sending power information used for the data transmission or the transmission of the trigger information;

modulation and coding strategy MCS information used for the data transmission or the transmission of the trigger information;

transport block size indication information;

hybrid automatic repeat request HARQ process quantity information used for the data transmission;

HARQ process offset information used for the data transmission;

redundancy version RV configuration information used for the data transmission; or sequence information used for the transmission of the trigger information.

As an optional embodiment, the configuration information of the cycle resource includes at least one of the following:

resource time domain location information;

resource frequency domain location information;

resource time domain offset information;

resource frequency domain offset information;

a resource cycle;

a time interval between adjacent resource patterns;

a valid duration of the cycle resource; or a number of times of the cycle resource.

As an optional embodiment, the sequence information used for the transmission of the trigger information includes at least one of the following:

a sequence index indication;

a sequence offset indication; or a sequence format indication.

As an optional embodiment, the first information is carried in target information, and the target information includes at least one of the following:

sidelink control information;

radio resource control information;

sidelink feedback control information;

uplink control information;

uplink data information; or a control unit in a medium access control layer, where the sidelink control information further includes first-level sidelink control information and second-level sidelink control information.

As an optional embodiment, the first receiving module includes:

a first receiving sub-module, configured to receive the first information sent by the first terminal device on the first resource; and the first resource includes at least one of the following:

a physical sidelink feedback channel;

a physical sidelink data channel;

a physical sidelink control channel;

a physical uplink control channel;

a physical uplink data channel;

a resource in a specific resource pool;

a resource on a specific sub-band in the resource pool;

a resource on a specific symbol in the resource pool; or a resource on a specific sub-frame in the resource pool.

As an optional embodiment, the apparatus further includes:

a selection module, configured to select or reserve, according to the first information, the cycle resources indicated by the first information for the data transmission or the transmission of the trigger information or the transmission of the assistance information; and a transmission module, configured to perform the data transmission or the transmission of the trigger information or the transmission of the assistance information on the cycle resources.

As an optional embodiment, the apparatus further includes:

a second sending module, configured to send second information, where the second information includes a fourteenth indication field used for indicating reserved resource location information; and the fourteenth indication field is an independent indication field, or the fourteenth indication field is a jointly encoded indication field; and each code point in the fourteenth indication field respectively corresponds to at least one of the following:

an $n1^{th}$ resource or m1 resources in at least one cycle in the cycle resources indicated by the first information, and an $n1^{th}$ resource or m1 resources reserved in other cycles;

an $n2^{th}$ resource or m2 resources in at least one cycle in the cycle resources indicated by the first information, where all resources are reserved in other cycles;

resources in an $n3^{th}$ cycle in the cycle resources indicated by the first information;

resources in m3 cycles in the cycle resources indicated by the first information;

all cycle resources indicated by the first information being reserved; or the cycle resources indicated by the first information being not reserved, where n1, n2, n3, m1, m2, and m3 are respectively positive integers.

As an optional embodiment, the apparatus further includes:

a third sending module, configured to send third information, where the third information includes a fifteenth indication field used for indicating reserved resource cycle information, each code point in the fifteenth indication field respectively corresponds to a different duration, and the fifteenth indication field is an independent indication field, or the fifteenth indication field is a jointly encoded indication field.

As an optional embodiment, the apparatus further includes:

a size determining module, configured to determine, according to the transport block size indication information and/or the MCS indication information included in the first information, a size of a transport block for the data transmission or the transmission of the trigger information for triggering the transmission of the assistance information.

As an optional embodiment, the apparatus further includes:

a second receiving module, configured to receive the first information sent by the first terminal device; and a first processing module, configured to release the selected or reserved cycle resources based on the first information, or enable, based on the first information, cycle resources selected or reserved according to at least one piece of closest first information.

As an optional embodiment, the apparatus further includes:

a second processing module, configured to release, in a case that resource release indication information sent by the first terminal device is received, resources selected or reserved according to the cycle resources indicated by the first information; and/or enable, in a case that resource enabling indication information sent by the first terminal device is received, the resources selected or reserved according to the cycle resources indicated by the first information.

As an optional embodiment. the resource release indication information and/or the resource enabling indication information are carried in at least one of the following information:

the first information;

sidelink control information;

sidelink feedback control information;

radio resource control information;

a control unit in a medium access control layer;

uplink control information; or downlink control information.

In this embodiment of this application, a first terminal device sends first information to at least one second terminal device, and the first information assists the second terminal device to select (or reserve) a cycle resource for transmission of data or trigger information or assistance information, which can resolve the problems of a large data transmission delay and large transmission overheads of the assistance information or the trigger information, thereby reducing the data transmission delay and reducing the transmission overheads of the assistance information or the trigger information. In addition, modifications of existing resource allocation solutions and modifications at a signaling level are small, thereby having good compatibility.

It should be noted that, the information transmission apparatus provided in this embodiment of this application is an information transmission apparatus that can execute the above information transmission method, and all embodiments of the above information transmission method are applicable to the apparatus, and can achieve same or similar beneficial effects.

The information transmission apparatus in this embodiment of this application may be an apparatus, or may be a component, an integrated circuit, or a chip in a terminal. The apparatus may be a mobile electronic device or a non-mobile electronic device. Exemplarily, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like, and the non-mobile electronic device may be a server, a network attached memory (NAS), a personal computer (PC), a television (TV), a teller machine, a self-service machine, or the like. This is not specifically limited in this embodiment of this application.

The information transmission apparatus in this embodiment of this application may be an apparatus having an operating system. The operating system may be an android (Android) operating system, may be an ios operating system, and may also be another possible operating system. This is not specifically limited in this embodiment of this application.

The information transmission apparatus provided in this embodiment of this application can implement all processes implemented by the method embodiments of FIG. 1 to FIG. 10. To avoid repetition, details are not described herein again.

Figure 13:
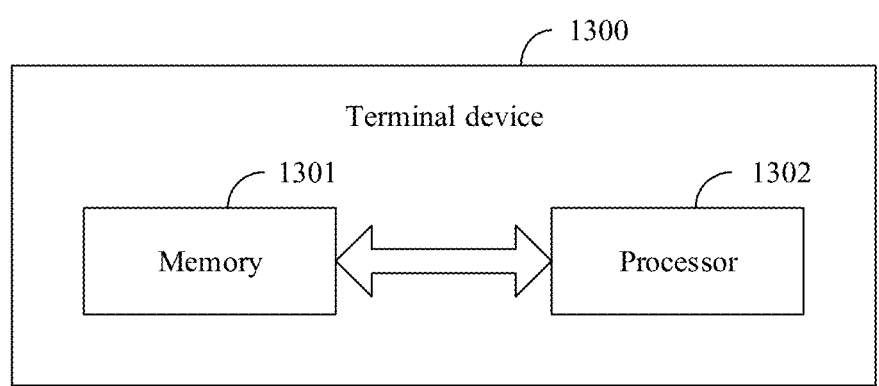
FIG. 13 is a first schematic structural diagram of a terminal device according to an embodiment of this application.

Optionally, as shown in FIG. 13, an embodiment of this application further provides a terminal device, including a processor 1302, a memory 1301, and a program or instruction stored on the memory 1301 and executable on the processor 1302. The program or instruction, when executed by the processor 1302, implements all processes of the embodiments of the above information transmission method, and can achieve the same technical effects. To avoid repetition, details are not described herein again.

It should be noted that, the electronic device in this embodiment of this application includes the above mobile electronic device and non-mobile electronic device.

Figure 14:
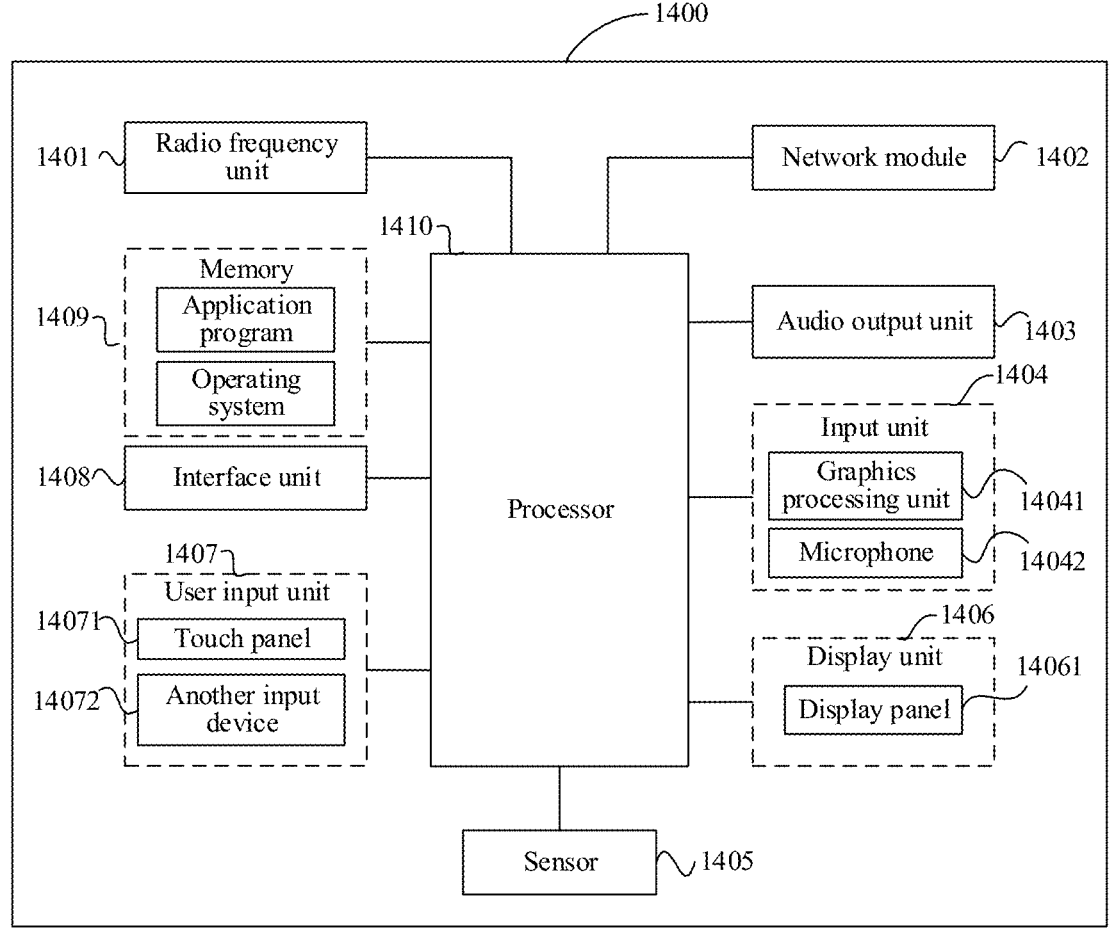
FIG. 14 is a second schematic structural diagram of a terminal device according to an embodiment of this application.

FIG. 14 is a schematic diagram of a hardware structure of a terminal device that implements the embodiments of this application.

A terminal device 1400 includes, but is not limited to, components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art may understand that the terminal 1400 further includes a power supply (such as a battery) for supplying power to the components. The power supply may logically connect to the processor 1410 by using a power supply management system, thereby implementing functions, such as charging, discharging, and power consumption management, by using the power supply management system. A terminal structure shown in FIG. 14 does not constitute a limitation to the terminal, and the terminal may include more or fewer components than those shown in the figure, or some components may be combined, or a different component deployment may be used. Details are not described herein again.

It should be understood that, in this embodiment of this application, the input unit 1404 may include a graphics processing unit (GPU) 14041 and a microphone 14042. The graphics processing unit 14041 performs processing on image data of a static picture or a video that is obtained by an image acquisition apparatus (for example, a camera) in a video acquisition mode or an image acquisition mode. The display unit 1406 may include a display panel 14061, for example, the display panel 14061 may be configured in a form such as a liquid crystal display or an organic light-emitting diode. the user input unit 1407 includes a touch panel 14071 and another input device 14072. The touch panel 14071 is also referred to as a touch screen. The touch panel 14071 may include two parts: a touch detection apparatus and a touch controller. the another input device 14072 may include, but is not limited to, a physical keyboard, a functional key (for example, a volume control key or a switch key), a track ball, a mouse, and a joystick, and the details will not be described herein again.

In this embodiment of this application, the radio frequency unit 1401 receives downlink data from a network-side device and transmits downlink data to the processor 1410 for processing. In addition, the radio frequency unit 1401 transmits uplink data to the network-side device. Generally, the radio frequency unit 1401 includes, but is not limited to, an antenna, at least one amplifier, a transceiver, a coupler, a low noise amplifier, a duplexer, and the like.

The memory 1409 may be configured to store a software program or instruction and various data. The memory 1409 may mainly include a program or instruction storage region and a data storage region. The program or instruction storage region may store an operating system, an application program or instruction required by at least one function (for example, a sound playback function and an image playback function), or the like. The memory 1409 may include a high speed random access memory, and may also include a non-volatile memory. The nonvolatile memory may be a read-only memory (read-only memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. For example, the nonvolatile memory may be at least one magnetic disk storage device, a flash memory device, or other volatile solid-state storage devices.

The processor 1410 may include one or more processing units. Optionally, the processor 1410 may integrate an application processor and a modem. The application processor mainly processes an operating system, a user interface, an application program or instruction, and the like. The modem mainly processes wireless communication, such as a baseband processor. It may be understood that the foregoing modem may not be integrated into the processor 1410.

The radio frequency unit 1401 is configured to send first information to at least one second terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

Alternatively, the radio frequency unit 1401 is further configured to receive first information sent by a first terminal device, where the first information is used for assisting the second terminal device to select or reserve a cycle resource for data transmission; or the first information is used for assisting the second terminal device to select or reserve a cycle resource for transmission of trigger information; or the first information is used for assisting the second terminal device to select or reserve a cycle resource for transmission of assistance information, where the trigger information is used for triggering the transmission of the assistance information, the assistance information is used for assisting a third terminal device to select or reserve a resource for data transmission, and the third terminal device is a device receiving the assistance information.

In this embodiment of this application, a first terminal device sends first information to at least one second terminal device, and the first information assists the second terminal device to select (or reserve) a cycle resource for transmission of data or trigger information or assistance information, which can resolve the problems of a large data transmission delay and large transmission overheads of the assistance information or the trigger information, thereby reducing the data transmission delay and reducing the transmission overheads of the assistance information or the trigger information. In addition, modifications of existing resource allocation solutions and modifications at a signaling level are small, thereby having good compatibility.

It should be noted that, the information transmission apparatus provided in this embodiment of this application is an information transmission apparatus that can execute the above information transmission method, and all embodiments of the above information transmission method are applicable to the apparatus, and can achieve same or similar beneficial effects.

An embodiment of this application further provides a readable storage medium, storing a program or instruction. The program or instruction, when executed by a processor, implements all processes of the embodiments of the above information transmission method, and can achieve the same technical effects. To avoid repetition, details are not described herein again.

The processor is the processor in the above electronic device in the foregoing embodiments. The readable storage medium includes a computer-readable storage medium, for example, a computer read-only memory (ROM), a random access memory (RAM), a magnetic disk, or an optical disc.

An embodiment of this application further provides a chip, including: a processor and a communication interface, where the communication interface is coupled to the processor, and the processor is configured to run a program or instruction, to implement all processes of the embodiments of the above information transmission method, and can achieve the same technical effects. To avoid repetition, details are not described herein again.

It should be understood that, the chip mentioned in this embodiment of this application may also be referred to as a system-level chip, a system chip, a chip system, a system on chip, or the like.

It may be understood that the embodiments described in the present disclosure may be implemented by hardware, software, firmware, middleware, microcode, or a combination thereof. For hardware implementation, a module, a unit, a sub-module, and a sub-unit may be implemented in one or more application-specific integrated circuits (ASIC), a digital signal processor (DSP), a digital signal processing device (DSP Device, DSPD), a programmable logic device (PLD), a field-programmable gate array (FPGA), a general purpose processor, a controller, a micro-controller, a microprocessor, and other electronic units configured to execute the functions described in this application, or a combination of the above.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the existing technologies may be implemented in the form of a software product. The computer software product is stored in a storage medium (for example, a read-only memory (ROM)/random access memory (RAM), a magnetic disk or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method performed by a first terminal device, comprising:
 sending first information to at least one second terminal device, wherein the first information is used for assisting the second terminal device to select or reserve a cycle resource for transmission of assistance information,
 the assistance information is used for assisting a third terminal device to select or reserve a resource for data transmission, and the third terminal device is a device receiving the assistance information;
 the first information comprises:
 configuration information of the cycle resource;
 redundancy version (RV) configuration information used for the data transmission;
 the first information is carried in target information, and the target information comprises sidelink control information; the sidelink control information further comprises first-level sidelink control information and second-level sidelink control information.

2. The method according to claim 1, wherein the first information further comprises at least one of the following information:
 resource release indication information;
 resource enabling indication information;
 sending power information used for the transmission of the assistance information;
 modulation and coding strategy (MCS) information used for the transmission of the assistance information;
 transport block size indication information;
 hybrid automatic repeat request (HARQ) process quantity information used for the data transmission; or
 HARQ process offset information used for the data transmission.

3. The method according to claim 2, wherein the configuration information of the cycle resource comprises at least one of the following:
 resource time domain location information;
 resource frequency domain location information;
 resource time domain offset information;
 resource frequency domain offset information;
 a resource cycle;
 a time interval between adjacent resource patterns;
 a valid duration of the cycle resource; or
 a number of times of the cycle resource.

4. The method according to claim 1, wherein the sending first information to at least one second terminal device comprises:
 sending, on a first resource, the first information to the at least one second terminal device; and the first resource comprises at least one of the following:
 a physical sidelink feedback channel;
 a physical sidelink data channel;
 a physical sidelink control channel;
 a physical uplink control channel;
 a physical uplink data channel;
 a resource in a specific resource pool;
 a resource on a specific sub-band in the resource pool;
 a resource on a specific symbol in the resource pool; or
 a resource on a specific sub-frame in the resource pool.

5. The method according to claim 1, wherein
 a resource cycle of the cycle resource is indicated by a first indication field in the target information; and each code point in the first indication field respectively corresponds to at least one duration, wherein
 the first indication field is an independent indication field, or the first indication field is a jointly encoded indication field.

6. The method according to claim 1, wherein
 a valid duration of the cycle resource is indicated by a second indication field in the target information; and each code point in the second indication field respectively corresponds to at least one duration, wherein
 the second indication field is an independent indication field, or the second indication field is a jointly encoded indication field.

7. The method according to claim 3, further comprising:
 determining the configuration information of the cycle resource according to quality of service QoS information of a to-be-transmitted service.

8. The method according to claim 1, wherein
 RV configuration information used for the data transmission is indicated by a ninth indication field in the target information; and each code point in the ninth indication field respectively corresponds to at least one type of RV configuration, wherein
 the ninth indication field is an independent indication field, or the ninth indication field is a jointly encoded indication field.

9. A terminal device, comprising:
 a processor; and
 a memory storing a program or instruction that is executable on the processor, wherein the program or instruction, when executed by the processor, causes the terminal device to perform the following steps:
 sending first information to at least one second terminal device, wherein the first information is used for assisting the second terminal device to select or reserve a cycle resource for transmission of assistance information,
 the assistance information is used for assisting a third terminal device to select or reserve a resource for data transmission, and the third terminal device is a device receiving the assistance information;
 the first information comprises:
 configuration information of the cycle resource;
 redundancy version (RV) configuration information used for the data transmission;
 the first information is carried in target information, and the target information comprises sidelink control information; the sidelink control information further comprises first-level sidelink control information and second-level sidelink control information.

10. The terminal device according to claim 9, wherein the first information further comprises at least one of the following information:

resource release indication information;

resource enabling indication information;

sending power information used for the transmission of the assistance information;

modulation and coding strategy (MCS) information used for the transmission of the assistance information;

transport block size indication information;

hybrid automatic repeat request (HARQ) process quantity information used for the data transmission; or HARQ process offset information used for the data transmission.

11. The terminal device according to claim 10, wherein the configuration information of the cycle resource comprises at least one of the following:

resource time domain location information;

resource frequency domain location information;

resource time domain offset information;

resource frequency domain offset information;

a resource cycle;

a time interval between adjacent resource patterns;

a valid duration of the cycle resource; or a number of times of the cycle resource.

12. The terminal device according to claim 9, wherein the sending first information to at least one second terminal device comprises:

sending, on a first resource, the first information to the at least one second terminal device; and the first resource comprises at least one of the following:

a physical sidelink feedback channel;

a physical sidelink data channel;

a physical sidelink control channel;

a physical uplink control channel;

a physical uplink data channel;

a resource in a specific resource pool;

a resource on a specific sub-band in the resource pool;

a resource on a specific symbol in the resource pool; or a resource on a specific sub-frame in the resource pool.

13. The terminal device according to claim 9, wherein a resource cycle of the cycle resource is indicated by a first indication field in the target information; and each code point in the first indication field respectively corresponds to at least one duration, wherein the first indication field is an independent indication field, or the first indication field is a jointly encoded indication field.

14. The terminal device according to claim 9, wherein a valid duration of the cycle resource is indicated by a second indication field in the target information; and each code point in the second indication field respectively corresponds to at least one duration, wherein the second indication field is an independent indication field, or the second indication field is a jointly encoded indication field.

15. The terminal device according to claim 11, wherein the program or instruction, when executed by the processor, causes the terminal device to further perform the following steps:

determining the configuration information of the cycle resource according to quality of service QoS information of a to-be-transmitted service.

16. The terminal device according to claim 9, wherein

RV configuration information used for the data transmission is indicated by a ninth indication field in the target information; and each code point in the ninth indication field respectively corresponds to at least one type of RV configuration, wherein the ninth indication field is an independent indication field, or the ninth indication field is a jointly encoded indication field.

* * * * *